(12) United States Patent
Pelzer (10) Patent No.: US 12,181,652 B2
(45) Date of Patent: Dec. 31, 2024

(54) METHOD FOR GENERATING AN IMAGE BY MEANS OF A MICROSCOPE AND CORRESPONDING MICROSCOPE

(71) Applicant: LEICA MICROSYSTEMS CMS GMBH, Wetzlar (DE)

(72) Inventor: Patric Pelzer, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 192 days.

(21) Appl. No.: 17/427,965

(22) PCT Filed: Jan. 27, 2020

(86) PCT No.: PCT/EP2020/051886
§ 371 (c)(1),
(2) Date: Aug. 3, 2021

(87) PCT Pub. No.: WO2020/160949
PCT Pub. Date: Aug. 13, 2020

(65) Prior Publication Data
US 2022/0128809 A1 Apr. 28, 2022

(30) Foreign Application Priority Data
Feb. 6, 2019 (DE) .................... 10 2019 102 959.7

(51) Int. Cl.
*G02B 21/36* (2006.01)
*G02B 21/00* (2006.01)

(52) U.S. Cl.
CPC ....... *G02B 21/365* (2013.01); *G02B 21/0032* (2013.01); *G02B 21/008* (2013.01)

(58) Field of Classification Search
CPC .......................... G02B 21/365; G02B 21/0032; G02B 21/008; G03B 7/00; H04N 23/61; H04N 23/72
See application file for complete search history.

(56) References Cited

U.S. PATENT DOCUMENTS

| 8,724,103 B2 | 5/2014 | Knebel et al. |
| 10,261,300 B2 | 4/2019 | Lippert et al. |
| 10,317,657 B2 | 6/2019 | Kleppe et al. |
| 2002/0105723 A1 | 8/2002 | Bewersdorf et al. |
| 2003/0016301 A1* | 1/2003 | Aizaki .................. H04N 23/72 348/79 |
| 2004/0000639 A1* | 1/2004 | Storz .................. G02B 21/0076 250/310 |

(Continued)

FOREIGN PATENT DOCUMENTS

| CN | 103048779 A | 4/2013 |
| CN | 105556370 A | 5/2016 |

(Continued)

*Primary Examiner* — Michael E Teitelbaum
(74) *Attorney, Agent, or Firm* — LEYDIG, VOIT & MAYER, LTD.

(57) ABSTRACT

A method for image generation by means of a microscope includes: locating a sample to be imaged in an object space of the microscope for the image generation using specified image generation parameters; firstly detecting a movement or an intended movement of the sample; and thereupon automatically changing at least one image generation parameter during the movement of the sample depending on a movement variable.

18 Claims, 4 Drawing Sheets

(56) References Cited

U.S. PATENT DOCUMENTS

| | | | |
|---|---|---|---|
| 2005/0121596 A1* | 6/2005 | Kam | G02B 7/38 |
| | | | 250/201.4 |
| 2006/0210262 A1 | 9/2006 | Fujiyoshi et al. | |
| 2010/0214403 A1* | 8/2010 | Ueda | H04N 23/73 |
| | | | 348/79 |
| 2011/0182529 A1 | 7/2011 | Kempe et al. | |
| 2012/0069171 A1 | 3/2012 | Kodaira et al. | |
| 2016/0170197 A1* | 6/2016 | Kenny | G01N 21/274 |
| | | | 348/79 |
| 2018/0172971 A1* | 6/2018 | Zhou | G01P 13/00 |

FOREIGN PATENT DOCUMENTS

| | | |
|---|---|---|
| CN | 108254909 A | 7/2018 |
| DE | 102008049878 A1 | 4/2010 |
| EP | 1223450 A2 | 7/2002 |
| EP | 2207055 A1 | 7/2010 |
| EP | 2873998 A1 | 5/2015 |
| JP | H 07 253548 A | 10/1995 |

\* cited by examiner

METHOD FOR GENERATING AN IMAGE BY MEANS OF A MICROSCOPE AND CORRESPONDING MICROSCOPE

CROSS-REFERENCE TO PRIOR APPLICATIONS

This application is a U.S. National Phase application under 35 U.S.C. § 371 of International Application No. PCT/EP2020/051886, filed on Jan. 27, 2020, and claims benefit to German Patent Application No. DE 10 2019 102 959.7, filed on Feb. 6, 2019. The International Application was published in German on Aug. 13, 2020 as WO 2020/160949 under PCT Article 21(2).

FIELD

The present invention relates to a method for image generation by means of a microscope, wherein a sample to be imaged is located for imaging using specified image generation parameters in the object space of the microscope, and to a corresponding microscope.

BACKGROUND

In known imaging or image generation methods by means of microscopes, the sample to be imaged or more precisely an arbitrarily selected reference point on said sample is located at a position in the object space of the microscope. The imaging or image generation takes place using image generation parameters which are generally set depending on the sample, the type of illumination, the microscope components used, and in general the selected microscopy method. The sample to be imaged is typically located on a microscope table, which can be moved to position the sample in at least the plane perpendicular to the optical axis defined by the microscope objective. The microscope table plane is typically referred to as the x-y plane, so that the optical axis extends in the z direction. The microscope objective and/or the microscope table is usually displaceable in the z direction for focusing. So-called fixed stage microscopes also exist, in which the microscope structure moves relative to the unmoving microscope table, which can solely be adjustable in the height. In the context of this application, the concept of an "x-y movement of the microscope table" is always to denote a relative movement of the microscope table or the sample located thereon relative to the optical axis of the microscope objective, so that fixed stage microscopes are expressly to be included.

In the above-mentioned microscopes known in principle from the prior art, movement artifacts in the generated image occur if the microscope table or the microscope objective is moved in the x and/or y and/or z direction during the image generation. The microscopes considered in the scope of this application may be roughly divided into wide-field microscopes and confocal microscopes. In wide-field microscopy, the generated image displays streaks upon such a movement. These streaks are less disturbing in the case of a movement in the z direction; however, it is necessary to wait out at least a full exposure time to be able to correctly estimate the sharpness. There are no longer movement artifacts in the image only when no movement has taken place within one exposure time. If the movement ends within an exposure interval, it is necessary to wait out a full exposure time (without movement) once again after its end.

In confocal microscopy, the sample is illuminated in a punctiform manner via an x-y scanner and the generated image is built up line by line. An offset between the already recorded lines, the lines during the movement and the lines after the movement thus results in the event of a movement of the sample in the object space. The longer a frame or the sample detail located in the field of view is scanned, the longer it lasts until all image lines have updated and the sample is reproduced at the new position. As in wide-field microscopy, the correct imaging plane also has to be found by movement in the z direction in confocal microscopy. The artifacts arising in this case behave similarly to a movement in the x-y direction. A full frame rate (image repetition rate) is needed until all pixels of the generated image represent the present focal plane.

There is therefore a demand for remedying or alleviating the problem of movement artifacts occurring in the event of a displacement or movement of the sample to be imaged in the object space of a microscope.

SUMMARY

In an embodiment, the present invention provides a method for image generation by means of a microscope, wherein a sample to be imaged is located in an object space of the microscope for the image generation using specified image generation parameters, the method comprising: detecting a movement or an intended movement of the sample; and thereupon automatically changing at least one image generation parameter during the movement of the sample depending on a movement variable.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a method for image generation by means of a microscope and a corresponding microscope as described herein.

In a method according to the invention for image generation by means of a microscope, in which a sample to be imaged is located in the object space of the microscope for the image generation using specified image generation parameters, firstly a movement or an intended movement of the sample is detected. At least one image generation parameter is thereupon automatically changed during the movement of the sample depending on a measured or predicted movement variable.

As already noted at the outset, the sample to be imaged or more precisely an arbitrarily selected reference point on this sample is typically located at a specific position in the object space of the microscope to enable imaging of the sample or a sample detail. If the sample, as likewise also already stated above, is to be moved in a spatial direction (x, y and/or z direction) during the image generation, undesired movement artifacts occur. In general, a movement of the sample can have various reasons. In addition to the above-described sample displacement, for example, a movement of the sample (living cells and the like) itself is possible, although, for example, the microscope table is not adjusted, or a random, unintended movement takes place, for example, due to impact on the microscope or the microscope table.

To avoid the movement artifacts resulting therefrom, according to the invention, firstly a movement of the sample is detected, for example, caused by movement of the microscope table in the x and/or y direction or by activation of the z drive for focusing. According to the invention, an intended movement of the sample, in other words an upcoming movement of the sample, can also be detected. This comprises cases in which it is to be presumed that a movement of the sample is upcoming, for example, if a user or the microscope system itself has given corresponding control commands to move the sample, for example, by inputting new x, y and/or z coordinates, thus a new position, of the sample or the mentioned reference point on this sample. The system or the control unit of the microscope can automatically predict corresponding movement variables therefrom, for example, at which velocity and/or acceleration the new position will be approached, and can adjust automatically to a change of image generation parameters. According to the invention, at least one image generation parameter is automatically changed during the movement of the sample. It is advantageous in particular for this purpose to increase the image frequency and/or to reduce the exposure time as image generation parameters. In that such suitable image generation parameters are changed during the movement of the sample, interfering movement artifacts in the image can be reduced or entirely avoided. A faster image sequence or image frequency (frame rate) results in a faster refresh of the generated image, a shorter exposure time (latency time in general) increases the chronological resolution and thus results in imaging adapted to the movement.

According to the invention, the at least one image generation parameter is changed depending on a movement variable during the movement of the sample. This "movement variable" can be one of the following parameters or a combination of such parameters: a movement velocity (absolute or relative change of a distance or route per unit of time), a movement acceleration (change of a movement velocity per unit of time), a change of the current coordinates of a reference point on the sample and/or on the microscope table and/or on the microscope objective. In the case of an upcoming, i.e., intended movement of the sample, such a movement variable is ascertained in that, on the basis of the known device parameters, such as the control curves for the movement of the microscope table, and the intended displacement of the sample (for example after input of the new sample position), the corresponding movement variable (typical movement velocity or acceleration of the microscope table when approaching the new position) is determined or predicted beforehand.

The ascertainment of such a movement variable enables the relevant image generation parameter or parameters to be changed depending on the ascertained movement variable, for example, directly proportional thereto or according to a specified function as a function of the movement variable. This furthermore permits the relevant image generation parameter or parameters to be changed only when the movement variable of the actual movement or the predicted, i.e., intended movement exceeds a specified threshold value. In this way, minor or slow movements, which accordingly only result in movement artifacts to a minor extent, can remain unconsidered. In contrast, movements over greater distances or rapidly occurring movements can be considered accordingly. This is the case, for example, if the sample is moved or moves itself partially or entirely out of the field of view of a microscope objective of the microscope. Intrinsic movements of the sample are expressly included. These occur, for example, upon movement of organelles, movement of single cells, movement of organs or muscles, such as heartbeat, in small organisms, or movement of the organisms themselves, for example in the case of life cell imaging.

For example, an intended, i.e., upcoming movement of the sample can be detected if a user input takes place to change the coordinates of the sample. This user input can comprise, for example, one or more button presses, touching a touch screen, an input by means of gestures, or a speech input. It is also possible to use a separate input device which is operationally connected to the microscope and enables a selection for a table movement.

This can be a control command for a translational movement of the sample within the field of view and/or for a movement along the optical axis (z direction). The system or the control unit of the microscope can also check in this case, for example, whether the upcoming movement of the sample or the corresponding movement variable exceeds the specified threshold value. Alternatively, it is possible to work without threshold value. In this case, the change of the at least one image generation parameter is performed upon each change occurred of the movement variable.

For this purpose, the at least one image generation parameter can be changed in each case by a fixed absolute value or set to a predefined value.

Alternatively, the change of the at least one image generation parameter can be performed dynamically with the movement of the sample. For this purpose, a function can be stored in the processing unit of the microscope, which defines a continuous change of the at least one image generation parameter as a function of the change of the movement variable.

Alternatively, in turn, multiple threshold values can be specified, so that depending on the movement variable of the movement or the intended movement, upon exceeding the respective threshold values, specific image generation parameters are changed and/or a specific image generation parameter is changed in a different way adapted to the movement variable.

In particular, wide-field microscopes and confocal microscopes are to be considered in the scope of the present application. A wide-field microscope is to be understood as a light microscope which can be operated, for example, in transmitted light illumination or in incident light illumination. These also include fluorescence microscopes, such as the typical epifluorescence microscopes. Furthermore, these include inverse microscopes and upright microscopes. Such wide-field microscopes generally have a light-sensitive detector (sensor in general) for imaging, in particular a camera. According to the invention, an exposure time of the light-sensitive detector or the camera during the movement of the sample is shortened as the image generation parameter. In a confocal microscope, it is expedient to increase a scanner frequency of the confocal microscope during the movement of the sample as the image generation parameter. Alternatively, the scanning resolution of the confocal scanner can be reduced.

In addition, it can be useful both for wide-field microscopes and also for confocal microscopes to reduce downstream image processing during the movement of the sample, for example, to restrict or end offsetting of multiple images or postprocessing of images.

Furthermore, it is advantageous to compensate for a light loss possibly accompanying a change of the at least one image generation parameter or more generally a reduction of an amount of light detected or signal strength measured for the image generation. In this way, the image quality can be maintained as much as possible with respect to image brightness and contrast. It is advantageous here to compensate for a possible light loss or the mentioned signal strength reduction by increasing the amplification of a sensor used for the imaging, such as the mentioned light-sensitive detector for imaging or the mentioned camera. Additional or alternative measures are increasing the exposure intensity of an illumination unit of the microscope used for illuminating the sample to be imaged, enlarging a pinhole used in a confocal microscope, reducing the resolution in the generated image (binning), and/or adapting the image contrast upon the display of the image displayed to a user.

In a further advantageous embodiment of the method according to the invention, an end of the movement of the sample is detected. This is easily possible, for example, in the case of a detected command to move the sample, since an end of the movement takes place upon reaching the new position. Alternatively, the actual movement is tracked and after a predetermined duration of a non-movement, an end of the movement can be presumed. After the end of the movement, in particular the image generation parameters set before the movement are set again. For this purpose, it is useful to store the respectively set image generation parameters. At least the image generation parameters are to be stored before a change takes place due to a sample movement. Alternatively, new image generation parameters can be set after the end of the movement of the sample.

The invention furthermore relates to a microscope comprising a microscope objective and an image generation unit, downstream of the microscope objective in an observation beam path of the microscope, for image generation using specified image generation parameters. Furthermore, the microscope comprises a microscope table for accommodating a sample to be imaged and a positioning unit for positioning the sample (or more precisely an arbitrarily selectable reference point of the sample) in the object space of the microscope, wherein the positioning unit has a communication connection to the image generation unit in such a way that after detection of a movement or an intended, i.e., upcoming movement of the sample, at least one image generation parameter is changed during the movement of the sample depending on a movement variable. For this purpose, the microscope according to the invention comprises in particular a control unit, which has a communication connection to the positioning unit and the image generation unit, i.e., is connected thereto by a signal line or wirelessly, wherein the control unit is configured in such a way that after detection of a movement or an intended, i.e., upcoming movement of the sample, at least one image generation parameter is changed during the movement of the sample depending on a movement variable.

The detection of an actual or upcoming movement of the sample can take place, for example, via the positioning unit in that, for example, positioning signals from the control unit to the positioning unit or positioning signals from the positioning unit itself are evaluated.

Alternatively or additionally, for example, a signal of a measurement beam which is reflected at the sample can be evaluated to be able to conclude a position change of the sample. Such position-sensitive measurement beams are known, for example, from autofocus technology.

Alternatively or additionally, the microscope can be equipped with an image evaluation unit which detects the movement of the sample by image evaluation and ascertains a movement variable, wherein at least one image generation parameter is changed during the movement of the sample, if, for example, one of the following conditions is met beforehand:

A movement is detected and a corresponding trigger signal is generated;

A movement variable is ascertained and compared to a threshold value, wherein a trigger signal is generated upon exceeding the threshold value;

A movement variable is ascertained and a trigger signal is generated which is proportional to the value of the movement variable;

A movement variable is ascertained and a trigger signal is generated which is proportional to the value of the movement variable, wherein upon exceeding a threshold value, the proportionality factor of the trigger signal is changed.

The microscope objective is used together with the image generation unit of the microscope to generate an image of the sample or a sample detail. The microscope table of the microscope is used to accommodate the sample to be imaged and is generally movable in a plane which is perpendicular to the optical axis defined by the microscope objective. The microscope table and/or the microscope objective are often movable in the direction of the optical axis (z direction), in particular to set the focus. It is in turn to be noted that all movements are to be interpreted as relative movements of the sample with respect to the optical axis of the microscope objective, so that so-called fixed stage microscopes are also to be included. The positioning unit of the microscope according to the invention effectuates the positioning of the sample in the object space of the microscope, that is to say an arbitrarily selected reference point on the sample at specific x-y-z coordinates.

The mentioned control unit of the microscope according to the invention is expediently provided for implementing the method according to the invention, which control unit has a communication connection, on the one hand, to the positioning unit and, on the other hand, to the image generation unit and is configured in such a way that at least one image generation parameter is changed during a movement of the sample in the x and/or y and/or z direction depending on a movement variable. The control unit can also represent or comprise an evaluation unit, which detects a movement of the sample according to the above-described options and/or ascertains the corresponding movement variable. Reference is expressly made to the above statements in conjunction with the method according to the invention with respect to details and advantages of the microscope according to the invention.

In one advantageous embodiment, the microscope has an illumination unit for generating an illumination beam path oriented onto the sample, wherein the illumination intensity of the illumination unit is settable, in particular also via the control unit. In this way, possibly occurring light losses or image signal strength reductions, which are linked to a change of an image generation parameter, can be compensated for in that the illumination intensity is increased.

It is advantageous if the microscope according to the invention comprises a storage unit for storing set image generation parameters. In this way, after detection of an end of the movement of the sample, the image generation parameters set before the movement of the sample can be set again.

It is furthermore advantageous if the control unit of the microscope is configured in such a way that an intended movement of the sample is detected when a user input takes place to change the coordinates of the sample. Reference is made in this regard to the above statements in conjunction with the method according to the invention.

Furthermore, it is advantageous if the control unit of the microscope is configured in such a way that the at least one image generation parameter is changed during the movement of the sample only if the movement variable of the movement or the intended movement exceeds a specified threshold value. Reference is also to be made with respect to this embodiment to the above statements in conjunction with the method according to the invention.

In an alternative embodiment, the control unit of the microscope is configured in such a way that the at least one image generation parameter is changed during the movement of the sample proportionally to the movement variable of the movement or the intended movement. Reference is also to be made with respect to this embodiment to the above statements in conjunction with the method according to the invention.

The microscope according to the invention is designed in particular as a wide-field microscope and comprises a light-sensitive detector for imaging (camera) using variable exposure time. In another advantageous embodiment, the microscope according to the invention is designed as a confocal microscope and comprises a scanning unit for scanning an illumination beam path over the sample to be imaged, wherein the scanner frequency and/or the scanning resolution of the scanning unit is changeable. Reference is made to the above statements and to the following exemplary embodiments with respect to the mentioned designs of the microscope according to the invention.

Finally, the invention relates to a computer program having program code, upon the execution of which on a processing unit, in particular the control unit of the microscope according to the invention, a method according to the invention is carried out. Furthermore, the invention relates to a corresponding computer program product having a computer program stored thereon having program code, upon the execution of which on a processing unit, in particular the control unit of the microscope according to the invention, a method according to the invention is carried out. The computer program can be downloaded or uploaded as such or stored or cached on a computer program product or implemented as firmware. Volatile or nonvolatile storage media, for example, a USB stick, RAM or ROM memories of known type, come into consideration as a computer program product. The mentioned processing unit can be the control unit of the microscope according to the invention or a part of this control unit.

Further advantages and embodiments of the invention result from the description and the appended drawing.

The above-mentioned features and the features still to be explained hereinafter are usable not only in the respectively specified combination but also in other combinations or alone without leaving the scope of the present invention.

The invention is schematically shown on the basis of an exemplary embodiment in the drawing and is described hereinafter with reference to the drawing.

Figure 1:
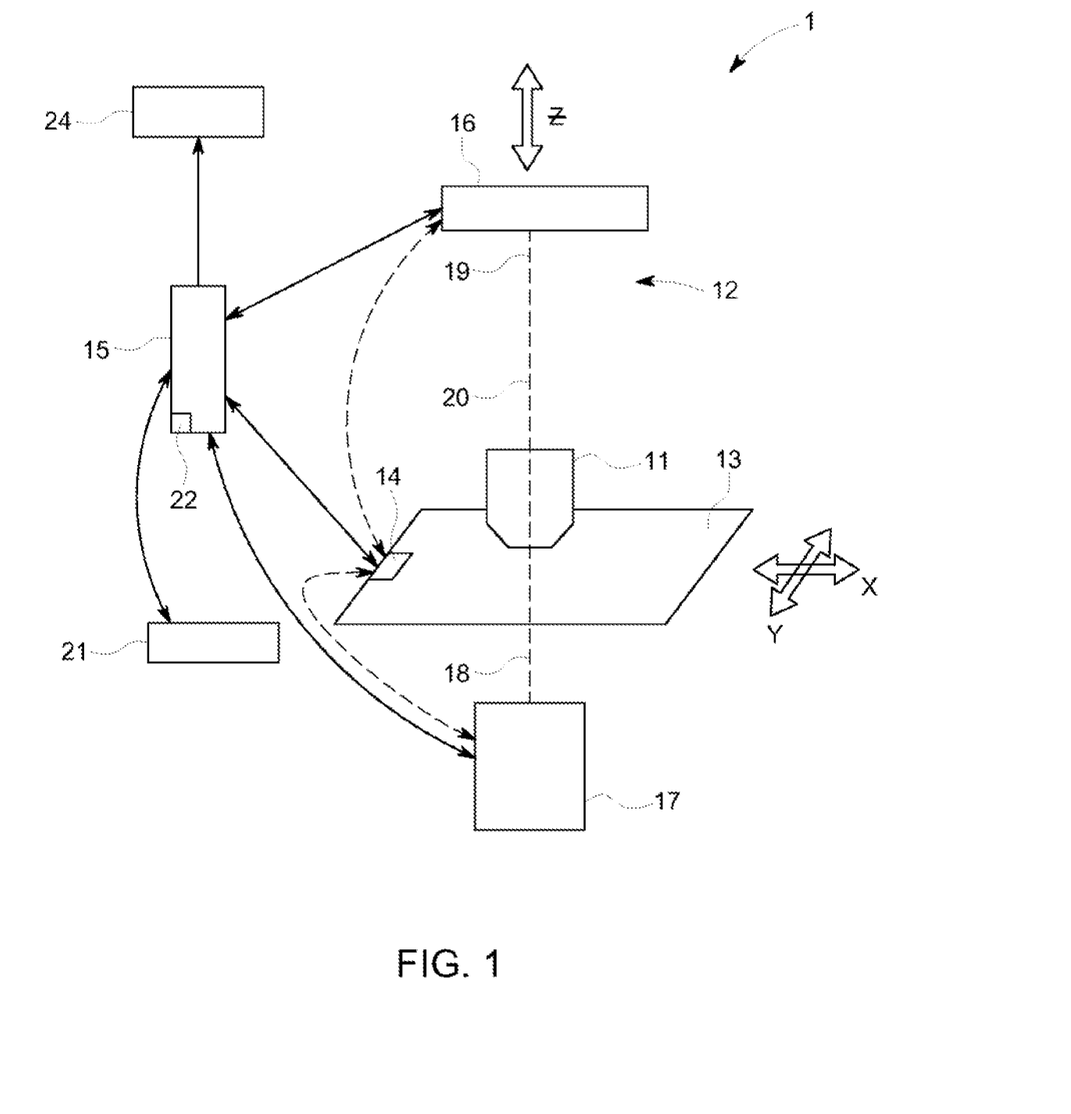
FIG. 1 schematically shows the most essential components of a microscope according to the invention in a first embodiment, FIG. 2 schematically shows the most essential components of a microscope according to the invention in a second embodiment, FIG. 3 schematically shows the most essential components of a microscope according to the invention in a third embodiment.
Figure 2:
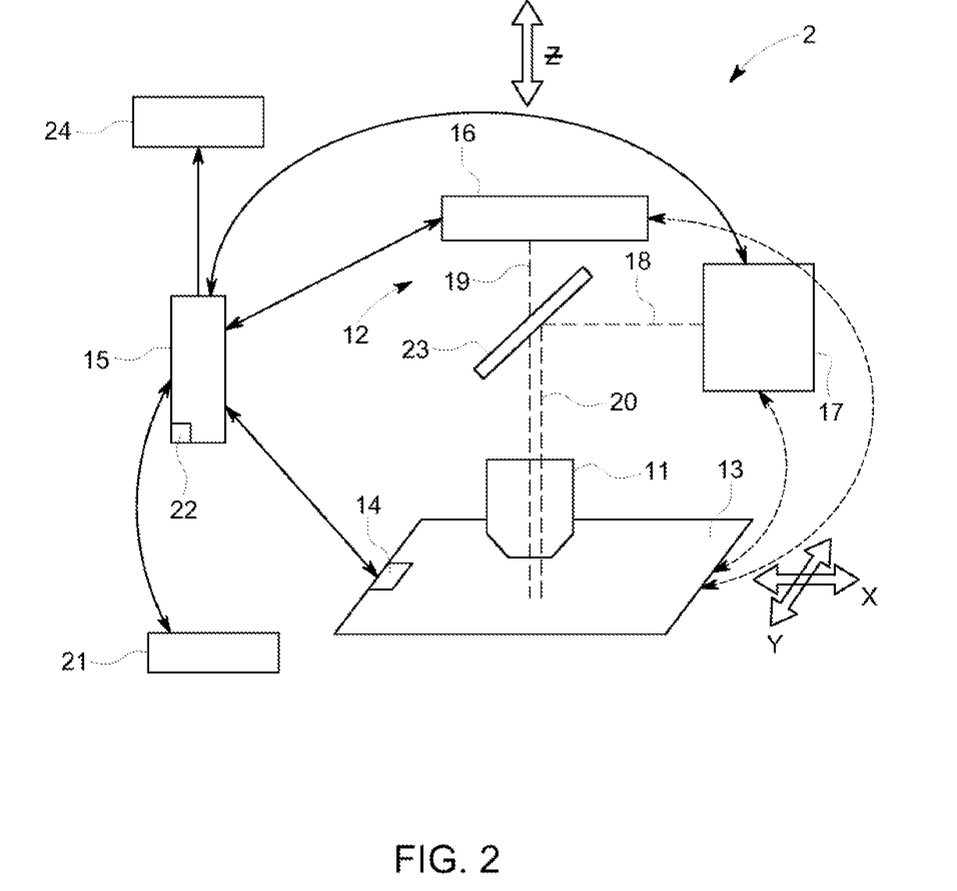
Figure 3:
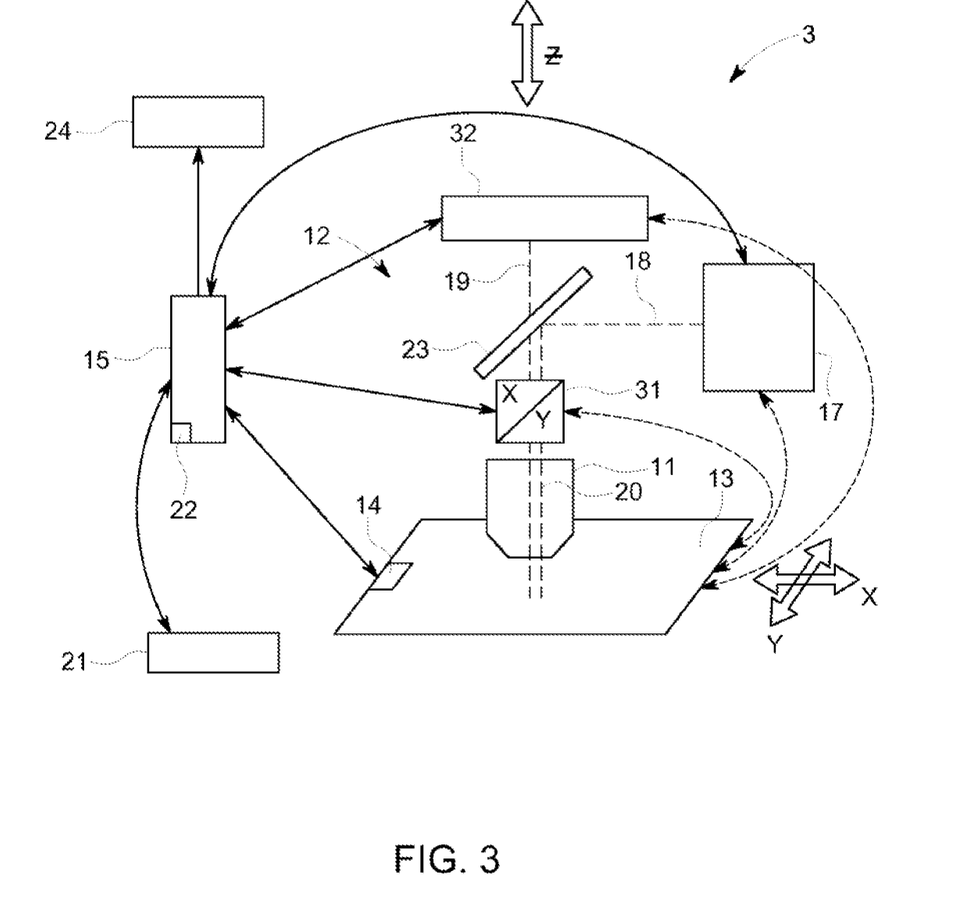

The figures are discussed universally hereinafter; identical reference signs identify structurally and/or functionally identical elements. The microscopes according to FIGS. 1 to 3 are only shown schematically with the components thereof essential for the present invention. Further components of the microscopes discussed therein are known as such from the prior art.

FIG. 1 shows as the microscope 1 a transmitted light microscope, which belongs to the species of the wide-field microscopes. The microscope 1 comprises an illumination unit 17, which is arranged below the microscope table 13. The microscope objective is identified by 11. It defines an optical axis 20 in a typical way. The illumination unit 17 typically comprises an illumination optical unit for generating an illumination beam path 18, which illuminates a sample arranged on the microscope table 13 by transmission. The sample is imaged by the microscope objective 11 and a downstream image generation optical unit, wherein a light-sensitive detector 16, for example a camera, can record the corresponding image, which is displayed on a display unit 24. The observation beam path is identified by 19. The image generation unit 12 comprises the image generation optical unit and the light-sensitive detector 16. The microscope table 13 is an x-y microscope table, which can be moved in the two spatial directions x and y, perpendicular to the optical axis 20 and thus perpendicular to the z axis extending in parallel to the optical axis. A positioning unit 14, which activates the corresponding drives of the x-y table, is used for this purpose. A user interface for setting microscope parameters is identified by 21. A user can define the desired microscopy method and parameters to be selected for this purpose via the user interface 21. A control unit 15, which has a communication connection to the user interface 21, generally then substantially automatically assumes the setting of all microscope parameters for the selected microscopic imaging.

As shown in FIG. 1, the control unit 15 has a communication connection to the positioning unit 14 and to the image generation unit 12, here to the light-sensitive detector or the camera 16 of the image generation unit 12. The image is displayed on a display unit 24, which is connected to the control unit 15 and/or to the camera 16. If a sample located on the microscope table 13 is moved in an arbitrary direction or moves itself in an arbitrary direction during the microscopic imaging, movement artifacts thus occur in the recorded microscopic image for the reasons mentioned at the outset. In the following, only sample movements in the x-y plane are considered without restriction of the generality. The microscope 1 shown in FIG. 1 is also equipped for sample movements in the z direction if the microscope table 13 shown therein is movable in the z direction. If only the microscope objective 11 is to be displaceable in the z direction, thus in parallel to the optical axis 20, in this case the positioning unit 14 would be connected either to the z drive of the objective 11 or the control unit 15 would have a communication connection to a separately activatable z drive of the objective 11.

During a movement of the sample in the x-y plane, immediately after the movement begins, at least one image generation parameter can be changed in such a way that occurring movement artifacts are reduced or eliminated in the best possible manner. For this purpose, the control unit 15 has a communication connection to the camera 16, in particular to shorten the exposure times of the camera 16.

Due to its connection to the microscope table 13 or the positioning unit 14, the control unit 15 can register an end of the movement. The system then automatically returns to the image generation parameters set before the movement or sets new image generation parameters. These are advantageously stored in a memory 22, which is part of the control unit 15 in this case. Of course, this memory 22 can also be implemented independently of the control unit 15. The control unit 15 can also represent or comprise an evaluation unit, which detects a movement of the sample according to the above-described options and ascertains the corresponding movement variable. In an alternative embodiment, the positioning unit 14 is directly connected to the camera 16 (dashed line). In this way, the control unit 15 can be entirely or partially omitted. The functions necessary for changing the image generation parameters are then implemented via the direct connection of positioning unit 14 and camera 16.

Furthermore, it is advantageous if a typically occurring image processing of microscopic images is reduced during the movement of the sample to adapt the image generation still better to the dynamics of the sample movement.

As is furthermore shown in FIG. 1, the control unit 15 is connected via a signal line to the illumination unit 17. Of course, all signal or communication connections shown here can be implemented via lines or wirelessly. The connection to the illumination unit 17 is used for the purpose of compensating for the light loss generated during the imaging using shortened exposure time. For this purpose, the control unit 15 increases the illumination intensity of the illumination unit 17 in such a way as to keep the image brightness essentially constant. This function can alternatively in turn be implemented in principle via a direct connection between positioning unit 14 and illumination unit 17 (dashed line). After the end of the movement of the sample, it is also possible in this example to return to the original illumination intensity.

In addition to the cases in which the system itself registers a movement of the sample, cases are conceivable in which an intended or upcoming movement of the sample can be recognized by the system. This is the case, for example, if a user inputs a new sample position in the x and/or y and/or z direction via the user interface 21, which is subsequently approached by the positioning unit 14. For this purpose, the microscope table 13 and/or the microscope objective 11 is displaced accordingly. As already mentioned above, the term "movement of the sample" comprises any relative movement between sample and objective 11. Thus, if a user selects, for example, a new x-y position and/or a new focal point via the user interface 21, the control unit 15 can thus already trigger the corresponding change of the at least one image generation parameter, so that the changed image generation parameters are set without delay upon beginning the movement. At the same time, the control unit 15 can store the original settings in the memory 22. If a change of the image generation parameters is only to be performed upon exceeding a specified threshold value of a movement variable, the control unit 15 can already check beforehand whether or not the upcoming movement exceeds this threshold value. For example, a minimum movement distance, a minimum velocity of the sample movement or else also a minimum acceleration of the sample movement can be specified as the threshold value of such a movement variable.

FIG. 2 shows a further embodiment of a wide field microscope 2, in the form of an epifluorescence microscope here. Only the essential features of such a microscope 2 are again shown. It again comprises a microscope table 13 and a microscope objective 11. A sample is arranged in the object space between objective 11 and microscope table 13. It is illuminated in incident light illumination. An illumination unit 17 is used to generate an illumination beam path 18. The generated illumination beam path 18 is coupled via a deflection element 23 into the optical axis 20 of the microscope 2 and is incident via the objective 11 on the sample. The fluorescent radiation emitted from the sample reaches, via the objective 11 and the deflection element 23, which is accordingly transmissive for this radiation, and an image generation optical unit, the light-sensitive detector 16, a camera here. Such fluorescence microscopes 2 are known as such from the prior art and are therefore not to be explained further in the present case.

The control unit of the microscope 2 is again identified by 15. It has a communication connection to both the camera 16 and also to the positioning unit 14 of the microscope table 13. In addition, the control unit 15 can also have a communication connection to the illumination unit 17. Finally, a user interface 21 can again be provided, which is connected to the control unit 15.

The statements made on FIG. 1 apply fully analogously in the case of an epifluorescence microscope 2 according to FIG. 2 with respect to the implementation of various embodiments of the method according to the invention. In the event of a detected sample movement, the exposure time of the camera 16 can again be reduced to reduce movement artifacts in the image. At the same time, for example, the illumination intensity of the illumination unit 17 can be increased to compensate for the light losses linked thereto. With respect to the further embodiments, such as detection of an intended or upcoming movement, exceeding of a threshold value of a movement variable, reference is expressly made to the statements in conjunction with FIG. 1, which apply fully analogously in the present case. This also applies to the alternatively conceivable direct connection of the positioning unit 14 to the camera 16 and/or the illumination unit 17 (dashed lines).

FIG. 3 shows a confocal microscope with its most important elements as a further embodiment of a microscope 3. The microscope 3 again comprises a microscope table 13 and a microscope objective 11. An illumination unit 17 generates an illumination beam path 18. This is coupled in via a deflection element 23 in parallel to the optical axis 20 and focused by the microscope objective 11 on the sample region to be imaged. Light originating from this point again reaches the light-sensitive detector 32, for example a photomultiplier tube (PMT) or a photon counter (for example hybrid detector), vice versa, through the microscope objective 11 and the downstream image generation unit 12. A known scanning unit 31 scans the illumination beam path 18 in a specified manner over the sample region to be imaged. The image frequency or frame rate is therefore specified in this way. Therefore, in the context of the present application, the scanning unit 31 is part of the image generation unit 12. Moreover, it is to be noted that other designs of a confocal microscope are also conceivable, in particular those in which the deflection element 23 and the scanning unit 31 form a structural unit, without leaving the basic concept of the present invention.

If, in the case of the confocal microscope 3 according to FIG. 3, a sample movement is established, a high-quality image can still be generated in that the control unit 15 has a communication connection to the scanning unit 31 and/or to the light-sensitive detector 32 and also to the positioning unit 14 and preferably also to the illumination unit 17. FIG. 3 again shows dashed lines, which illustrate that alternatively the positioning unit 14 can be directly interconnected to the scanning unit 31, the illumination unit 17 and/or the detector 32 while bypassing or giving up the control unit. In particular, the image frequency or frame rate may be increased by increasing the scanner frequency of the scanning unit 31 to reduce movement artifacts occurring in the event of a sample movement. Furthermore, the amplification of the detector 32 can optionally be increased and/or the illumination intensity of the illumination unit 17 can be increased to compensate for light losses.

With respect to further embodiments of the example according to FIG. 3, reference is expressly made to the statements in conjunction with FIGS. 1 and 2, which apply in a fully analogous way here.

Figure 4:
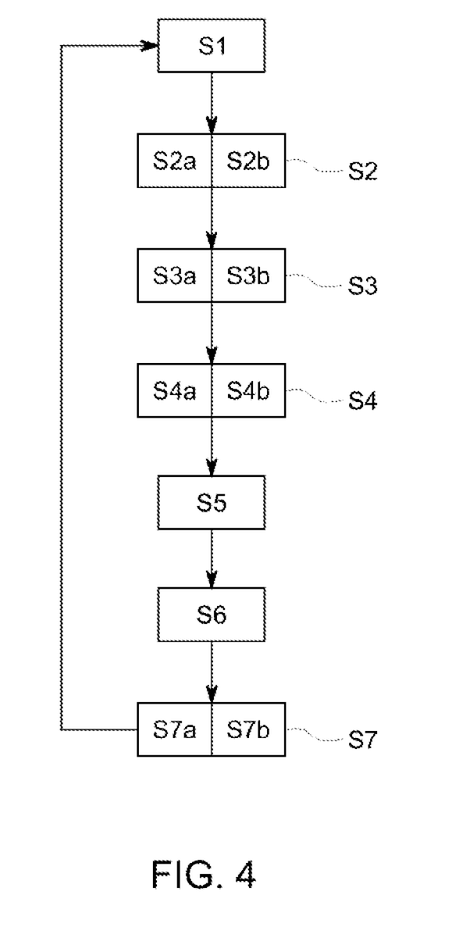
FIG. 4 shows the sequence of method steps of a method according to the invention according to possible embodiments.

FIG. 4 shows the sequence of method steps S1 to S7 in various embodiments of a method according to the invention. It comprises the following steps:

S1 denotes the step of continuous imaging or generating a live image using a microscope according to the invention, as was described, for example, on the basis of FIGS. 1 to 3.

Step S2 denotes two subcases, namely the case S2a of continuous tracking of the relative position of the sample, thus in particular the x-y-z coordinates of the sample, and the further case S2b of a user input for intended displacement of the sample to new x-y-z coordinates.

Step S3 describes two subcases, namely, for example, a displacement in the x-y-z direction (S3a), in particular in the above-described case S2a of the continuous tracking of the sample position, with continuous changing of the image generation parameters, for example via a specified function. The determination of exceeding a threshold value of a movement variable of this sample movement or displacement (step S3b) can take the place of this, after which a step-by-step or also continuous change of the image generation parameters takes place.

In step S4, the control unit of the microscope triggers the change of the at least one image generation parameter according to the method according to the invention, as was described by way of example on the basis of the exemplary embodiments according to FIGS. 1 to 3 (S4b). To be able to set the original settings again at a later point in time, in a prior step S4a, a storage of the image generation parameters can be performed, as have existed upon detection of a movement of the sample.

In step S5, the image generation is continued using the changed parameters during the movement of the sample.

In step S6, the end of the sample movement is detected/predicted.

Thereupon, in step S7, the control unit can either determine new image generation parameters for the further imaging (step S7a) or reestablish the image generation parameters stored in step S4a (step S7b).

Subsequently, the imaging is continued again, which corresponds to step S1 at the beginning of the method.

After an actual or an upcoming movement or displacement is detected in step S2 and one of the procedures according to S3a or S3b is selected, wherein steps S2a and S3a can generally also take place in parallel, the control unit of the microscope, in step S4b, triggers the change of the at least one image generation parameter according to the method according to the invention, as was described by way of example on the basis of the exemplary embodiments according to FIGS. 1 to 3. To be able to set the original settings again at a later time, a storage of the image generation parameters can be performed in a prior step S4a, as have existed upon detection of a movement of the sample. Alternatively, the determination of exceeding a threshold value of a movement variable of this sample movement or displacement (step S3b) can take the place of a detection of a sample movement or displacement with continuous change of the image generation parameters in step S3a. In this case, for example, it can be established whether or not the sample movement exceeds a defined minimum velocity. The image generation parameters are only changed in the case of exceeding a defined minimum velocity.

After changing the at least one image generation parameter in step S4, during the movement of the sample, the image generation is continued using the changed parameters (step S5). The resulting imaging supplies better images without movement artifacts in comparison to the prior art using unchanged image generation parameters. In step S6, the end of the sample movement is detected/anticipated. The control unit can thereupon either define new image generation parameters for the further imaging (step S7a) or reproduce the image generation parameters stored in step S4a (step S7b). Subsequently, the imaging is continued further using these image generation parameters, which corresponds to step S1 at the beginning of the method.

In the case of a user input for the sample movement or sample displacement to new coordinates in step S2b, the system recognizes an intended upcoming movement of the sample. Thereupon, for example, the image generation parameters existing before the movement can be immediately stored (S4a) and the change of the at least one image generation parameter can be triggered by the control unit (S4b). Both steps S4a and S4b can be triggered immediately with the beginning of the movement of the sample. Subsequently, the already above-described steps S5, S6 and S7 follow. In this case as well, a change of the at least one image generation parameter can only be performed when a predetermined threshold value of a movement variable is exceeded (S3b instead of S3a). The further course of the method corresponds to the embodiments already described in detail above.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1, 2, 3 microscope
11 microscope objective
12 image generation unit
13 microscope table
14 positioning unit
15 control unit
16 detector, camera
17 illumination unit
18 illumination beam path
19 observation beam path
20 optical axis
21 user interface
22 memory
23 deflection element
24 display unit
31 scanning unit
32 detector
x, y, z spatial direction
S1, S2, S2a, S2b, S3, S3a, S3b, S4, S4a, S4b, S5, S6, S7a, S7b method steps

The invention claimed is:

1. A method for image generation by means of a microscope, wherein a sample to be imaged is located in an object space of the microscope for the image generation using specified image generation parameters, the method comprising:
detecting a movement or an intended movement of the sample;
comparing a movement variable of the movement or the intended movement to a specified threshold value, wherein the specified threshold value is non-zero and comprises a minimum movement distance, a minimum velocity, or a minimum acceleration; and
upon determining that the movement variable exceeds the specified threshold value, automatically changing at least one image generation parameter during the movement of the sample depending on the movement variable, wherein the change of the at least one image generation parameter is performed dynamically, such that the at least one image generation parameter is changed continuously as a function of the movement variable.

2. The method of claim 1, wherein an amount of the change of the at least one image generation parameter is proportional to the movement variable of the movement or the intended movement.

3. The method of claim 1, wherein the intended movement of the sample is detected when a user input to change a position of the sample takes place.

4. The method of claim 1, wherein an image frequency is increased and/or an exposure time is reduced as the image generation parameter.

5. The method of claim 1, wherein a reduction of an amount of light detected for the image generation or a signal strength used for the image generation, which reduction accompanies a change of the at least one image generation parameter, is compensated for.

6. The method of claim 5, wherein the compensation of the reduction of a measured amount of light is performed by an increase of an amplification of a sensor used for imaging, an increase of an illumination intensity of an illumination unit used for illumination, an enlargement of a pinhole used in a confocal microscope, a reduction of a resolution, and/or an adaptation of an image contrast in a generated image.

7. The method according to claim 1, wherein an end of the movement of the sample is detected, and after the end of the movement, the image generation parameters set before the movement of the sample are set again, or new image generation parameters are set.

8. The method according to claim 1, wherein a wide-field microscope having a light-sensitive detector is used for the imaging as the microscope and an exposure time of the light-sensitive detector is shortened as the image generation parameter.

9. The method of claim 1, wherein a confocal microscope is used as the microscope and a scanner frequency of a scanning unit of the confocal microscope is increased, or a scanning resolution of the scanning unit is reduced, as the image generation parameter.

10. A microscope, comprising:
a microscope objective;
an image generation unit downstream of the microscope objective in an observation beam path of the microscope for image generation using settable image generation parameters;
a microscope table configured to accommodate a sample to be imaged;
a positioning unit configured to position the sample in an object space of the microscope, wherein the positioning unit has a communication connection to the image generation unit; and
a control unit having a communication connection to the positioning unit and the image generation unit, wherein the control unit is configured to, after detection of a movement or an intended movement of the sample and upon determining that a movement variable of the movement or the intended movement exceeds a specified threshold value, change at least one image generation parameter during the movement of the sample depending on the movement variable, the specified threshold value being non-zero and comprising a minimum movement distance, a minimum velocity, or a minimum acceleration, wherein the control unit is configured to change the at least one image generation parameter continuously during the movement of the sample as a function of the movement variable.

11. The microscope of claim 10, wherein the control unit is configured to change the at least one image generation parameter so that an amount of change is proportional to the movement variable.

12. The microscope of claim 10, further comprising:
an evaluation unit configured to detect the movement of the sample, the evaluation unit being configured such that positioning signals for the positioning unit are evaluated and/or a position-sensitive measurement beam signal of a measurement beam reflected from the sample is evaluated and/or an image recorded by the sample is evaluated by image processing.

13. The microscope of claim 10, further comprising:
an illumination unit configured to generate an illumination beam path oriented on the sample,
wherein an illumination intensity of the illumination beam path is settable.

14. The microscope of claim 10, further comprising:
a memory unit configured to store set image generation parameters.

15. The microscope of claim 10, wherein the control unit is configured such that the intended movement of the sample is detected when a user input to change the position of the sample takes place via a user interface.

16. The microscope of claim 10, wherein the microscope comprises a wide-field microscope, and
   wherein the microscope further comprises a light-sensitive detector configured to image using changeable exposure time.

17. The microscope of claim 10, wherein the microscope comprises a confocal microscope,
   wherein the microscope further comprises a scanning unit configured to scan an illumination beam path over the sample to be imaged, and
   wherein a scanner frequency or a scanning resolution of the scanning unit is changeable.

18. A non-transitory computer-readable medium having processor-executable instructions stored thereon, wherein the processor-executable instructions, when executed on a processing unit of a microscope, facilitate carrying out a method for image generation by means of the microscope, wherein a sample to be imaged is located in an object space of the microscope for the image generation using specified image generation parameters, the method comprising:
   detecting a movement or an intended movement of the sample;
   comparing a movement variable of the movement or the intended movement to a specified threshold value, wherein the specified threshold value is non-zero and comprises a minimum movement distance, a minimum velocity, or a minimum acceleration; and
   upon determining that the movement variable exceeds the specified threshold value, automatically changing at least one image generation parameter during the movement of the sample depending on the movement variable, wherein the change of the at least one image generation parameter is performed dynamically, such that the at least one image generation parameter is changed continuously as a function of the movement variable.

* * * * *